United States Patent [19]

Chapman et al.

[11] 3,711,881

[45] Jan. 23, 1973

[54] AIRCRAFT LOADING PASSAGEWAY WITH ELEVATABLE CANOPY

[75] Inventors: Bobby J. Chapman, Coral Gables; Joseph F. Vollmer, Miami, both of Fla.

[73] Assignee: said Vollmer, by said Chapman

[22] Filed: July 28, 1970

[21] Appl. No.: 58,757

[52] U.S. Cl. .....................................................14/71
[51] Int. Cl. ...............................................B65g 11/00
[58] Field of Search.............135/5 A; 14/71; 52/20 X

[56] References Cited

UNITED STATES PATENTS

| | | | |
|---|---|---|---|
| 3,099,847 | 8/1963 | Lodjic | 14/71 |
| 2,833,228 | 5/1958 | Martin | 135/5 A |
| 3,391,416 | 7/1968 | Riggles | 14/71 |
| 3,369,264 | 2/1968 | Kurka | 14/71 |
| 3,479,677 | 11/1969 | Burns | 14/71 |
| 3,317,942 | 5/1967 | Wollard | 14/71 |
| 3,588,934 | 6/1971 | Van Marle | 14/71 |

*Primary Examiner*—Nile C. Byers, Jr.
*Attorney*—Clarence A. O'Brien and Harvey B. Jacobson

[57] ABSTRACT

A passageway communicated with the fuselage of an airplane to facilitate enplaning and deplaning of passengers with an elevatable canopy at the outer end thereof mounted on an extendable and retractable carriage to enable a flexible member on the canopy to engage with the fuselage to enable the aircraft to be serviced by the use of a stairway with the passengers staying completely under cover while enplaning or deplaning. The canopy is vertically swingable about a hinge axis in one embodiment and vertically movable in another embodiment with both embodiments of the canopy being supported on a horizontally movable carriage to enable the canopy and passageway to accommodate various airplane fuselage configurations and constructions.

10 Claims, 8 Drawing Figures

Bobby J. Chapman
Joseph F. Vollmer
INVENTORS

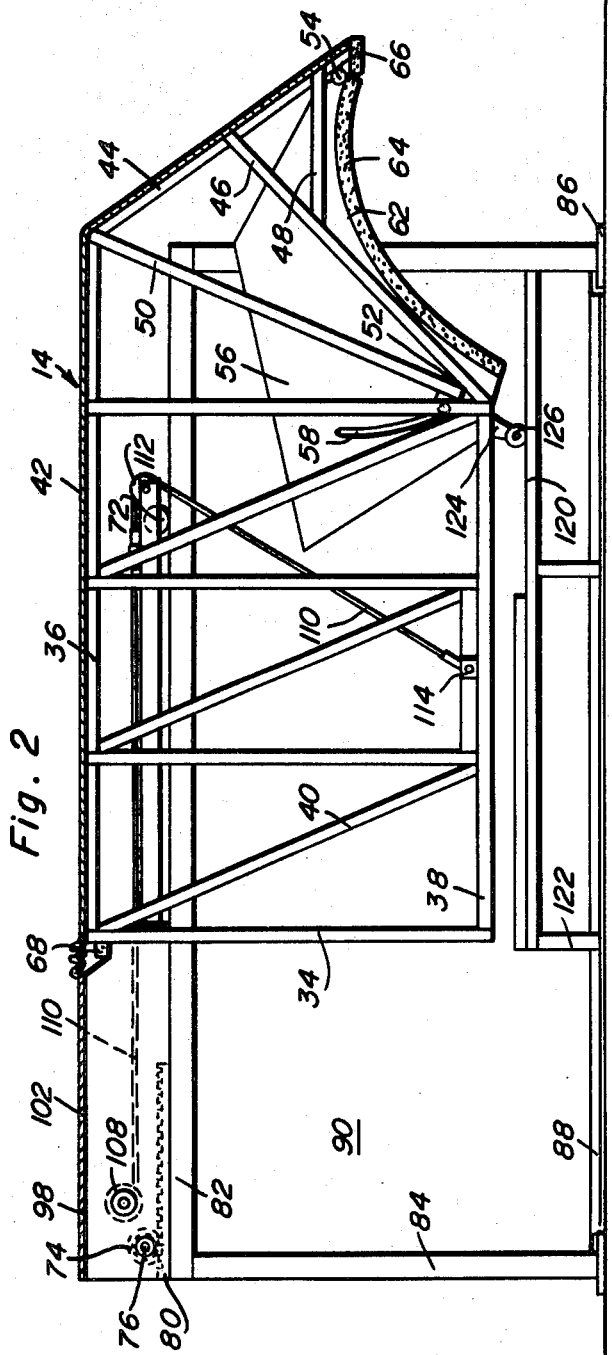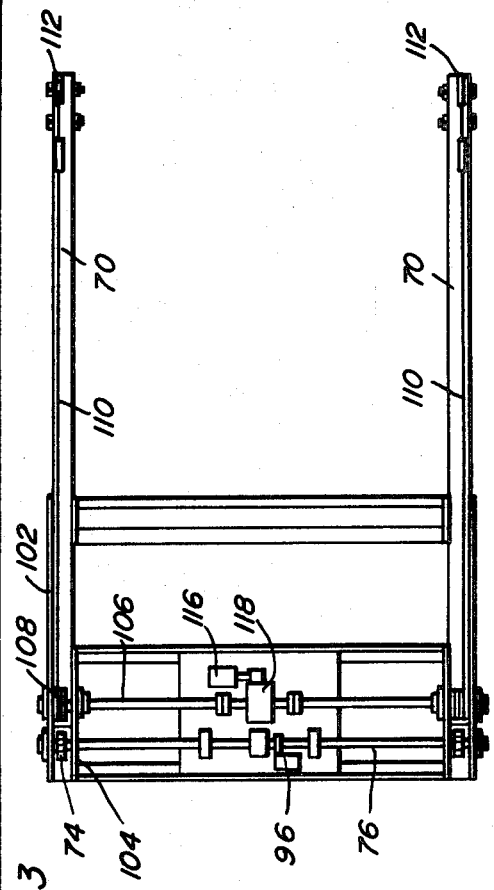
Bobby J. Chapman
Joseph F. Vollmer
INVENTORS

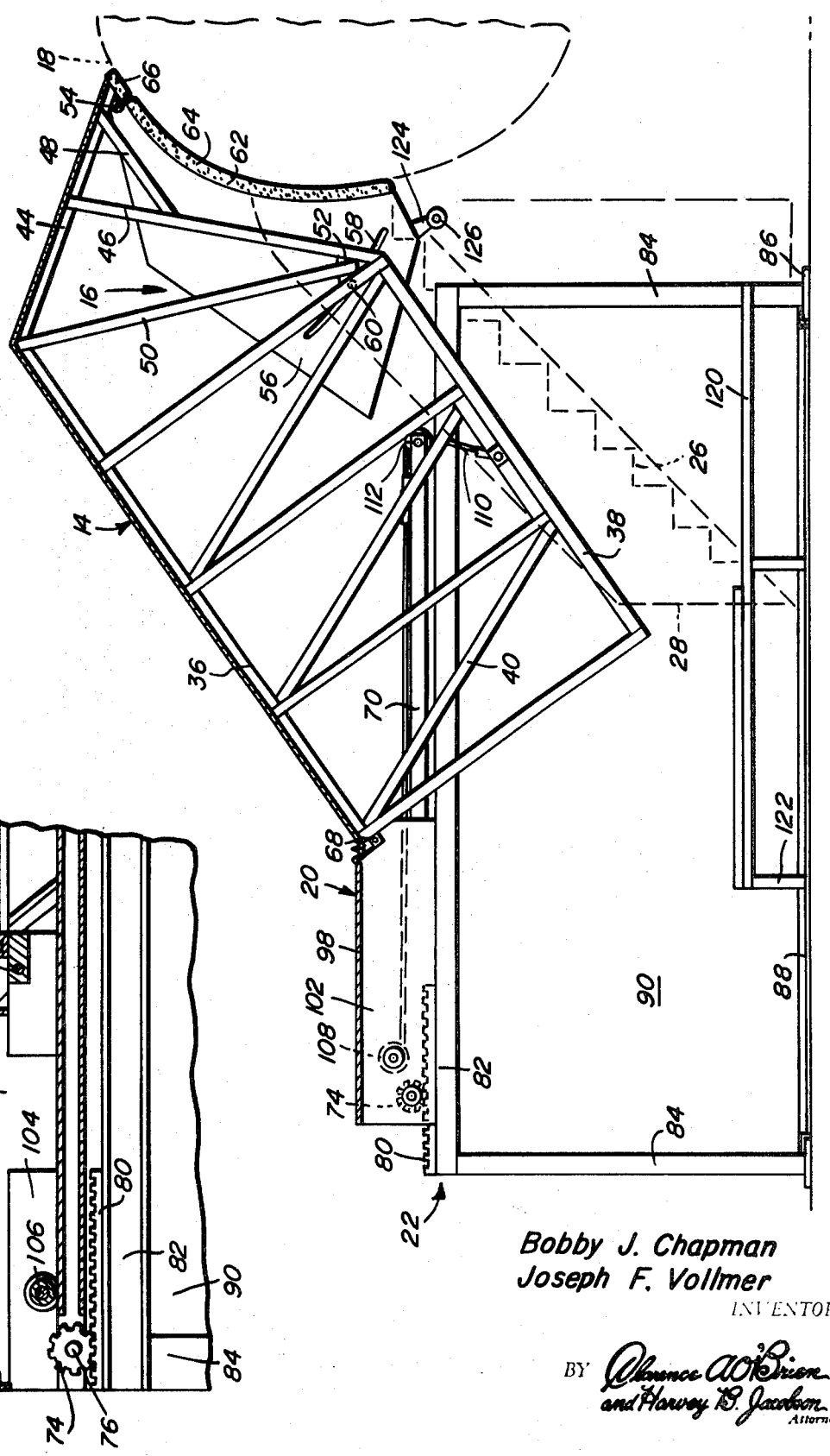

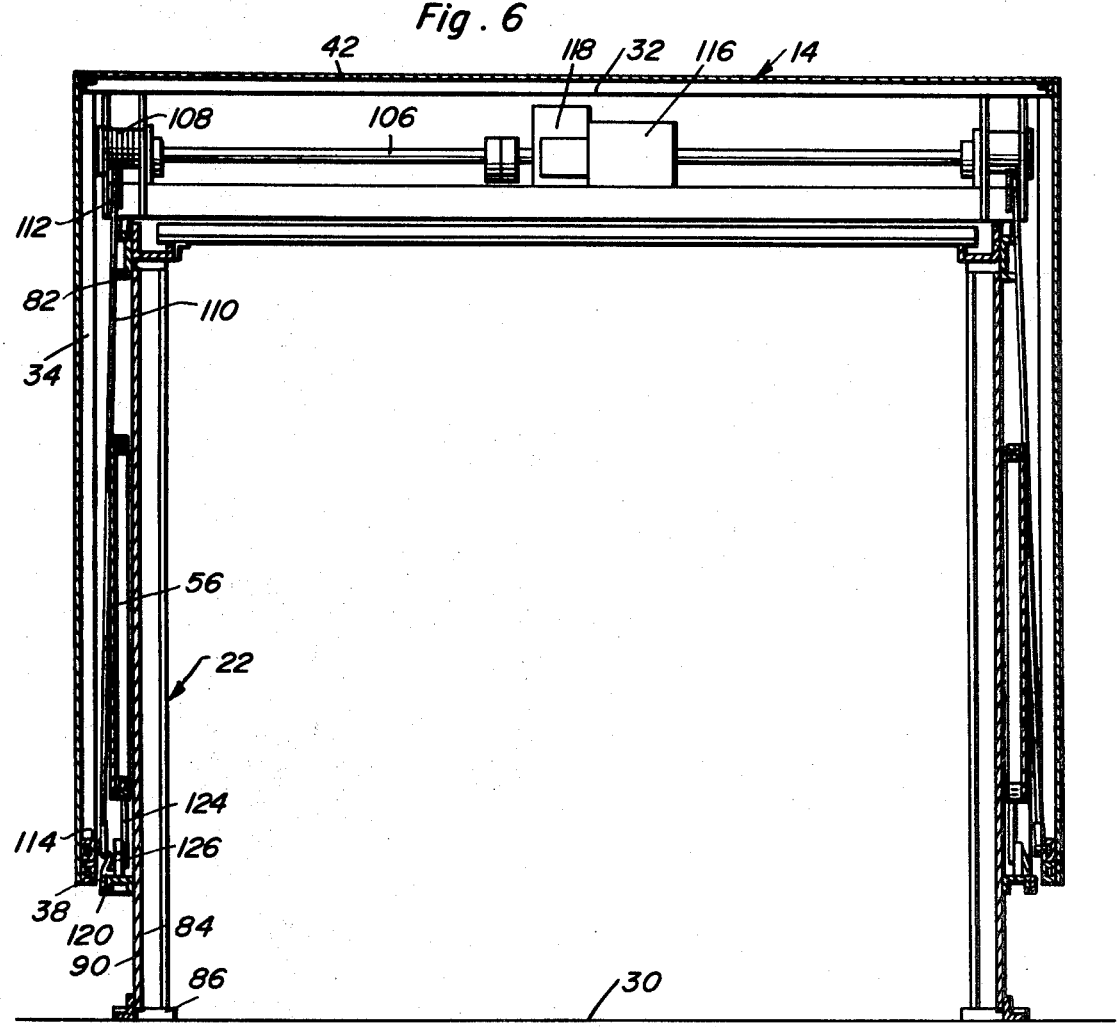
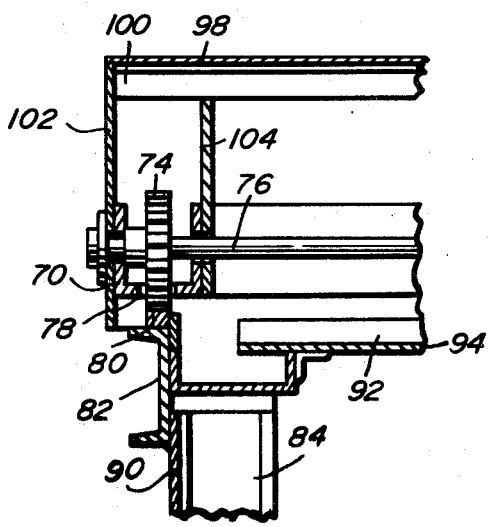

AIRCRAFT LOADING PASSAGEWAY WITH ELEVATABLE CANOPY

BACKGROUND OF INVENTION

1. Field of the Invention

The present invention generally relates to a passenger enplaning and deplaning passageway or ramp with a vertically and horizontally movable canopy at the outer and thereof for engagement with the fuselage of the aircraft to protect the passengers from exposure to outside atmospheric conditions.

2. Description of the Prior Art

To facilitate enplaning and deplaning of passengers from aircraft, various ramps, passageways and the like have been provided which form an enclosed bridge or passageway having one end in communication with the airport terminal building or the like and the other end registrable with the doorway in the fuselage of the aircraft. Examples of such devices are disclosed in prior U.S. Pat. Nos. 3,110,048; 3,121,243; 3,184,772; 3,310,823; 3,412,412; 3,422,477 and 3,479,677. While the previously developed devices have improved the comfort and safety of passengers when enplaning or deplaning, certain shortcomings and problems still exist. For example, the previously developed ramps or passageways employ the use of their own floor structure which precludes the use of stairs in an acceptable manner for servicing all aircraft regardless of the side of the aircraft or how the aircraft door is hinged. In addition, certain aircraft, such as the type which has a passenger door hinged along the top thereof do not permit a passenger to walk straight out of the door onto the floor of a ramp since the door does not open far enough to permit this. Additionally, the previously developed devices are quite complex and expensive to initially install as well as being expensive to operate and maintain thus introducing an economic barrier to the use of such devices especially where a relatively large number of such devices are necessary or the airport facilities do not justify such an expenditure.

SUMMARY OF THE INVENTION

An object of the invention is to provide a passageway having a movable canopy at the outer end thereof for engagement with the fuselage of an aircraft which is capable of accommodating all aircraft fuselage configurations, door opening arrangements, stairway arrangements and the like.

Another object of the invention is to provide a passageway for aircraft passengers when deplaning and enplaning fastened to the ground surface, pavement or the like and which uses such ground surface, pavement or the like as the floor of the passageway which enables the usual stairs to be employed by the passengers with the canopy at the end of the passageway enabling the passengers to be under cover as they employ the stairs when entering or leaving the airplane. The canopy is equally applicable to a unit that is capable of moving over the ground surface, pavement or the like.

A further object of the invention is to provide a passageway having a canopy at the outer end thereof which is vertically movable and which is supported on a horizontally movable carriage which is extendable and retractable for engagement with various aircraft fuselage configurations with the canopy employing a flexible member for sealing engagement with the fuselage of the aircraft peripherally of the door.

Another object of the present invention is to provide a canopy for a passageway that is vertically swingable about a horizontal axis.

Still another important feature of the invention is to provide a passageway for aircraft passengers having a canopy at the outer end thereof which is vertically movable while maintaining a generally constant horizontal orientation.

Yet another important object of the invention is to provide a passageway for aircraft passengers incorporating a vertically and horizontally movable canopy having a freely swingable adapter unit at the outer end thereof for engagement with the fuselage of the aircraft with movement of the adapter unit being controlled and guided so that it will combine with the remainder of the canopy and passageway to retain the passengers protected from the external atmosphere when enplaning and deplaning.

Still another important feature of the invention is to provide a passageway for loading and unloading aircraft which is relatively simple in construction and operation and may be constructed with a relatively low initial cost and operated and maintained economically.

The foregoing objects of the invention, and various other objects thereof which will be evident to those skilled in the airplane loading and unloading art in the light of this disclosure, may be achieved with the exemplary embodiment of the invention described in detail hereinafter and illustrated in the accompanying drawings.

DESCRIPTION OF THE DRAWINGS

FIG. 2 is a longitudinal sectional view of the canopy when in retracted position.

FIG. 3 is a top view of the carriage showing the motor and shaft assembly.

FIG. 4 is a longitudinal, sectional view of the canopy illustrating the device associated with the fuselage of an airplane.

FIG. 5 is a detailed sectional view illustrating the structure for extending and retracting the carriage and canopy mounted thereon.

FIG. 6 is a transverse, sectional view of the passageway illustrating the structure of the carriage and canopy.

FIG. 7 is a detailed sectional view illustrating the mechanism for extending and retracting the carriage.

DESCRIPTION OF PREFERRED EMBODIMENTS OF THE INVENTION

Figure 1:
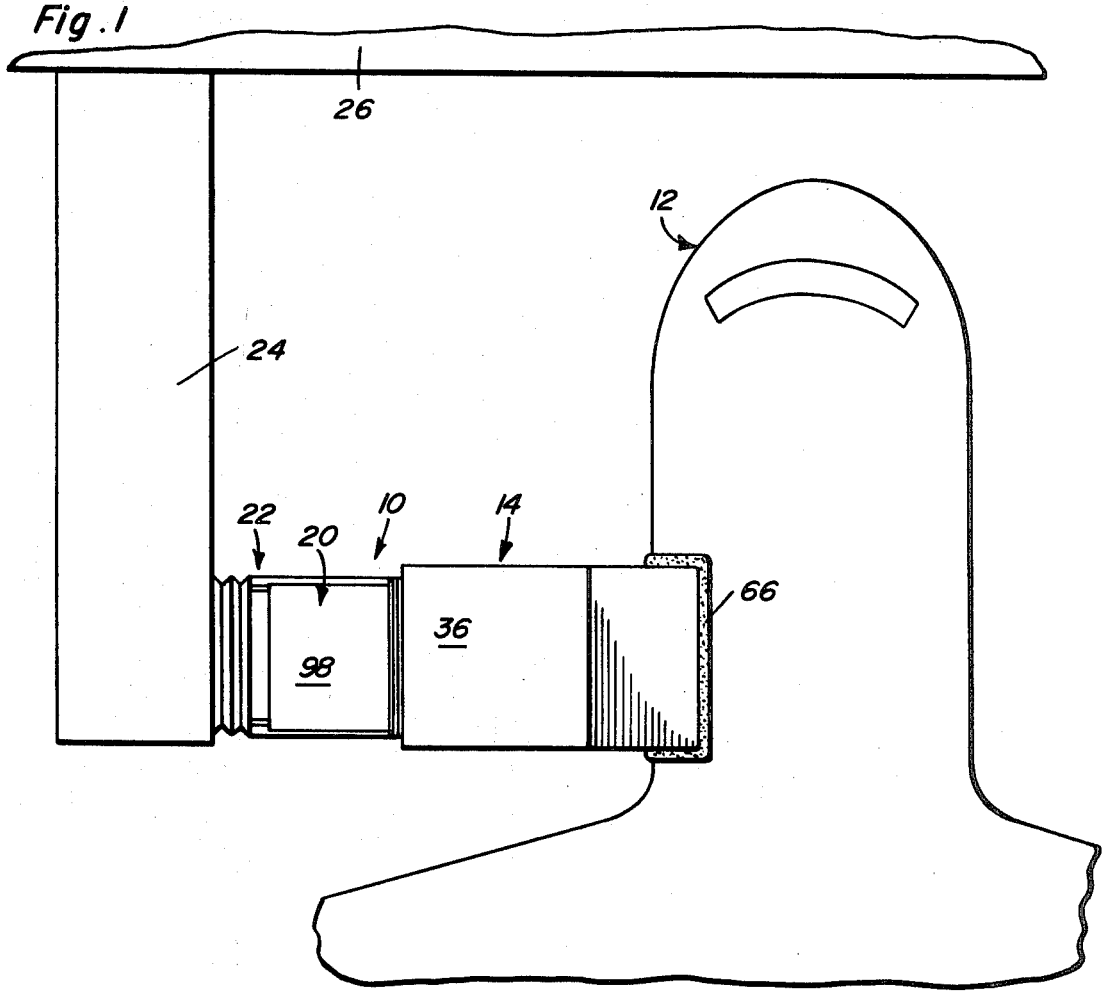
FIG. 1 is a plan view of the passageway and canopy illustrating an exemplary association with an aircraft and airport terminal building.

Referring now specifically to the drawings, the passageway incorporating the present invention therein is generally designated by the numeral 10 and is associated with the fuselage of an aircraft generally designated by the numeral 12 with the canopy which is vertically movable designated by the numeral 14. The canopy includes an adapter generally designated by the numeral 16 at its outer end for engagement with the curved surface of the aircraft fuselage 18 as illustrated in FIG. 4 and the other end of the canopy 14 is pivotally supported from a horizontally extendable and retractable carriage 20 that is supported from a stationary section 22 of the passageway. The stationary section 22 of the passageway 10 may be connected to a permanently installed passageway 24 that is communicated with an airport terminal building 26 or the like or may be associated with a movable passageway, directly communicated with the airport terminal building or otherwise associated with an enclosure so that passengers enplaning or deplaning may pass through the passageway 10 without being subjected to external atmospheric conditions which protects such passengers from inclement weather or other hazards existent at airports. The canopy 14 accommodates various configurations of aircraft fuselages and enables stairs or a stairway 26 to be employed for servicing the aircraft by which passengers may enter the fuselage or leave the fuselage with the stairway 26 being conventional and provided with usual handrails or the like 28 with the stairway being supported directly on the ground or pavement surface 30 which also forms a bottom for the passageway 10 thereby enabling the canopy to be employed with various types of airplane fuselage configurations and with various types of aircraft door opening arrangements or door arrangements including the type of door which hinges from the top edge and swings outwardly. By using the ground surface or pavement as the bottom of the passageway, the device may be securely supported in place and enables an economy in manufacture and moreover permits the use of a stairway type of ramp 26 to be employed with all types of aircraft fuselages.

The canopy 14 is generally of inverted U-shaped transverse cross-section including top frame members 32 and side frame members 34 which are rigidly interconnected at the juncture thereof by longitudinal frame members 36. The lower ends of the side frame members are interconnected by longitudinal frame members 38 and diagonal brace frame members 40 are provided to establish a rigid skeleton-type framework constructed of suitable frame members such as angle iron members, tubular members or the like. Supported on the frame structure and forming a closure for the top and sides of the canopy is a skin or panel 42 which may be of any suitable material either flexible or semi-rigid or of rigid construction with the skin or panel 42 serving to form a weatherproof cover for the top and two sides of the canopy through out the length thereof.

At the forward end of the canopy, the longitudinal frame members are inclined downwardly as indicated at 44 and the inclined longitudinal frame members are supported by a radially extending frame member 46 which has the lower end thereof connected with the outer end of the longitudinal frame member 38 as illustrated in FIG. 4. The outermost end of the frame member 44 is supported by a brace member 48 interconnecting the radial frame member 46 and the outer end portion of the frame member 44. The juncture between the frame members 36 and 44 is supported by an inclined radial frame member 50 with the lower ends of the frame members 46, 50 and the outermost side frame member 34 and the forward end of the longitudinal lower side members 38 are interconnected by a suitable gusset plate 52 or the like thus forming a rigid substantially U-shaped canopy structure in which the outer end thereof has a downwardly sloping roof section.

The forward end of the canopy 14 supports the adapter unit 16 therefrom by a hinged connection 54 located at the outer ends of the frame members 44. The adapter unit 16 includes a pair of side panels 56 each of which has an elongated arcuate slot 58 therein receiving a fastener 60 attached to the forward frame member 34 or the gusset plate 52 to guide and limit the free swinging movement of the adapter 16 about the transverse axis defined by the spaced hinge connections 54. The edge of the side panels 56 which face the aircraft fuselage 18 are arcuately curved as at 62 and provided with a covering or layer of resilient cushioning material 64 which cooperates with a transversely extending cushioning member 66 along the outer end of the frame members 44 which engages the fuselage 18 above the door and downwardly along each side of the door thereby protecting passengers from inclement weather or other hazards when they are enplaning or deplaning. The cushioning material 64 and 66 may be relatively thick and constructed of any suitable material such as an inflated member, a foam type resilient member or the like with the thickness of the material enabling the device to conform with various curvatures of airplane fuselages and the free swinging movement of the adapter unit 16 provides for intimate engagement of the resilient material with the fuselage. The side panels 56 of the adapter unit 16 may be in the form of a frame having a skin of flexible fabric or other similar material attached thereto with the exterior skin being relatively rigid and provided with a slot 58 therein.

The rear of the canopy is hingedly attached to the carriage 20 at its upper corner by projecting lugs 68 and suitable pivot bolts or the like. The pivot bolts connecting the canopy 14 to the carriage 20 define a transverse axis for pivotal movement of the canopy 14. The carriage 20 includes a pair of longitudinally extending channel-shaped rails 70 having a roller 72 journaled on the outer end thereof with the periphery of the rollers 72 projecting below the channel-shaped member 70. The other end of the channel-shaped member 70 has a gear 74 journaled therein with a shaft 76 extending through the channel-shaped member and supporting the gear therein which has a periphery extending downwardly through an opening 78 in the channel-shaped member 70 so that the periphery of the gear 74 is in meshing engagement with an elongated rack gear 80 supported stationarily on the stationary section 22 which has a pair of longitudinally extending frame members 82 underlying and supporting the rack gear 80. The longitudinal frame members are supported by stationary vertical support members 84 at each end thereof with the lower end of the members 84 being supported by supporting feet 86 or the like engaging the ground surface 30 and anchored thereto in any suitable manner with the lower ends of the supporting members 84 also being interconnected by a longitudinal rail or frame member 88. The wall surfaces of the stationary section 84 are closed by a skin or wall panel 90 supported by suitable framework interconnecting the vertical members 84. A portion of the length of the stationary section 82 is provided with transverse frame members 92 supporting a top skin 94 for that portion of the stationary section which is exposed when the carriage 20 is extended.

A motor 96 is drivingly connected with the shaft 76 so that when the motor is actuated, the shaft 76 and thus the gear 74 will be rotated thus moving the carriage 20 longitudinally of the stationary section 22. The motor may be reversible or provided with a reversible type of transmission to drive the carriage in a manner to either extend or retract the carriage in relation to the stationary section 22. As the carriage is moved longitudinally, the outermost roller 72 will roll on the track frame members 82 at the outer ends thereof and the gears 74 will support the end of the carriage having the motor or other power source 96 thereon.

The carriage 20 also includes top skin members 98 supported by framework 100 and including depending panels 102 and 104 which journal the shaft 76 and also journals a shaft 106 located forwardly of and above the shaft 76. Each end of the shaft 106 is provided with a winch drum 108 thereon on which a cable 110 is wound. The cable 110 extends forwardly around a pulley 112 mounted at the forward end of the longitudinal rails 70 on the carriage 20. The cable 110 then extends downwardly and is terminally attached to a bracket 114 connected between the lower ends of the vertical frame members 34 on the canopy as illustrated in FIGS. 2 and 3 so that when the cable 110 is wound onto the winch drum 108, the canopy will be elevated from a horizontal position illustrated in FIG. 2 to the upwardly inclined position illustrated in FIG. 4. The shaft 106 is driven from an electric motor or other suitable power source 116 through a reduction gear 118. The shaft may be driven in reverse direction by employing a reversible motor or a reverse gear assembly so that the canopy may be elevated and lowered.

Disposed longitudinally of each side portion of the stationary section 22 is a longitudinal track or guide 120 supported above the longitudinal members 88 by vertical support members 122. Depending from the lower edge of each side panel 56 of the adapter 16 is a bracket 124 having a roller 126 journaled thereon which engages the track 120 and rolls thereon so that the adapter unit 16 will normally be supported when the canopy is in horizontal position with the lower end of the slot 58 receiving the fastener 60 and the curved edge 62 of the side panels 56 generally facing downwardly toward the ground surface so that the adapter unit is actually protected from inclement weather when not in use. This also provides a support for the adapter unit during extension and retraction of the canopy when the motor 96 is actuated.

In the event of high wind conditions, the rollers 126 or the brackets 124 therefor may serve as tie-downs to prevent the adapter unit and canopy from being lifted or elevated by high wind. Also, the stationary longitudinal rail 82 may be provided with a stop abutment to limit the movement thereof or the rack gear 80 may be provided with a stop member to limit the movement of the gear 74 thereon. The stationary section 22 is provided with a top skin or member for a length at least equal to the length of movement of the carriage so that the passageway will be protected at all times whether the carriage is extended or retracted. The top surface of the carriage intermediate the hinge point and the end thereof remote from the aircraft fuselage will also be provided with a top skin or closure so that regardless of the position of the canopy and regardless of the position of the carriage, the passageway will be completely enclosed on top and along both sides thereof to protect the passengers. The stationary section of the passageway may be connected with other various configurations of stationary passageways and the particular frame structure and skin or panel structure may vary depending upon individual requirements. For example, sheet metal skin may be employed or in some instances, plastic materials may be employed and various standard framing structures and reinforcement structures may be employed wherever necessary.

Figure 8:
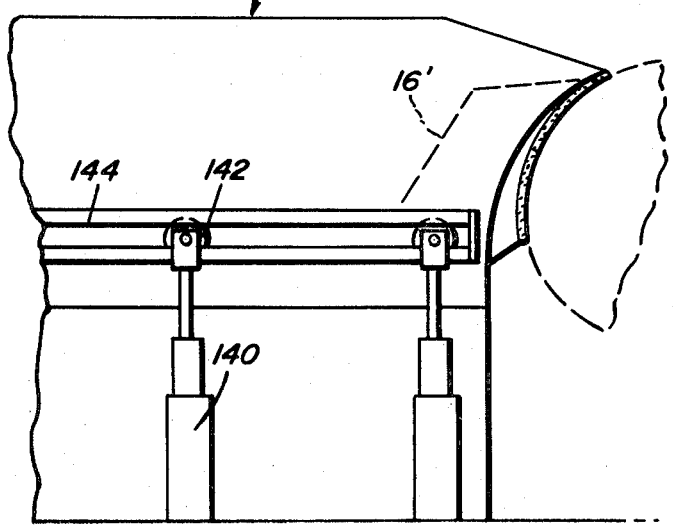
FIG. 8 is a fragmentary elevational view of another embodiment of the invention in which the canopy is vertically movable.

FIG. 8 illustrates a modified form of the invention in which the canopy 14' is vertically movable rather than being pivotal about a transverse axis as illustrated in FIGS. 1-7. The structure of the canopy 14' and the adapter unit 16' remains the same as the corresponding structure illustrated in FIGS. 1-7. However, in this arrangement, the canopy 14' is elevated by lift devices 140 which may be mechanical, pneumatic or hydraulic jacks or the like with the upper end of each lift device 140 having a roller 142 engaged in a longitudinally extending track 144 carried by the carriage to enable longitudinal extension and retraction of the canopy 14'.

In this construction, the canopy 14' is elevatable while maintaining horizontal disposition. A suitable weathertight connection may be provided between the elevatable canopy 14' and the stationary section of the passageway which may be accomplished in various ways. Also, the canopy 14' has side walls which telescope in relation to the lower side wall portions to enable the stairway to be used and to protect the passengers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

For example, a unit that is capable of moving over or along the ground surface does not necessarily require a separate horizontally movable carriage on which the canopy is hinged. Since such a bridge or unit in its entirety has the capability of moving toward and away from an aircraft, the canopy can be hinged directly to the forward section or be raised vertically and accomplish the same closure about the aircraft door as the unit that is fixed to the ground surface and described in detail. Additionally, a unit that is swingable in a fixed arc would not require a separate horizontally movable overhead carriage. It will be propelled by power to drive wheels on the ground with the elevatable canopy and adapter unit on the end thereof forming a closure about the aircraft door in the same manner as in the unit fixed to the ground as disclosed in detail. Thus, the significant feature of this invention relates to the elevatable canopy and the adapter unit whether the canopy is on an overhead movable carriage or not or whether the unit is fixed to the ground or not.

What is claimed as new is as follows:

1. In a passageway for covering a space between a doorway in the fuselage of an airplane and a stationary enclosure comprising a canopy including a top wall and depending side walls forming a protected passageway, means mounted at the outer end of the canopy for engagement with a fuselage of an airplane, and means supporting the canopy for horizontal movement in relation to the aircraft fuselage and for elevational movement for alignment thereof with the door in the fuselage of the aircraft, said canopy, means mounted at the outer end, and supporting means having an open bottom means partially forming the protected passageway for enabling servicing of the aircraft by the use of a stairway extending from the door in the fuselage and defined by a supporting surface on which the airplane and supporting means rest.

2. In a passageway for covering a space between a doorway in the fuselage of an airplane and a stationary enclosure comprising a canopy including a top wall and depending side walls forming a protected passageway, means mounted at the outer end of said canopy for engagement with a fuselage of an airplane, and means supporting said canopy for horizontal movement in relation to the aircraft fuselage and for elevational movement of alignment thereof with the door in the fuselage of the aircraft, said means at the outer end of said canopy including an adapter unit, said canopy, adapter unit and supporting means having an open bottom to enable servicing of the aircraft by the use of a stairway extending from the door in the fuselage with the bottom of the passageway defined by said adapter unit, canopy and supporting means therefor being defined by the supporting surface on which the components rest.

3. The structure as defined in claim 2 wherein said means supporting said canopy includes a carriage, and a stationary section of the passageway engaged by said carriage, and means interconnecting said carriage and said stationary section of the passageway for horizontally extending and retracting said carriage for moving said canopy toward and away from said airplane fuselage.

4. The structure as defined in claim 3 wherein said canopy is supported on said carriage for vertical swinging movement about a transverse axis at the end of said canopy remote from the aircraft fuselage.

5. The structure as defined in claim 4 wherein said adapter unit includes a pair of side panels, means hingedly connecting the side panels of said adapter unit to the upper outer end of said canopy, the edges of said panels on said adapter unit facing the aircraft fuselage being arcuately curved and provided with means for engaging the fuselage across the top and down along each side of the door therein for protecting passengers from surrounding atmospheric conditions.

6. The structure as defined in claim 5 together with guide and limiting means interconnecting said side panels of said adapter unit and said canopy for guiding and limiting free swinging movement of said adapter unit in relation to said canopy.

7. The structure as defined in claim 6 wherein the lower ends of said side panels on said adapter unit have rollers thereon, and track means associated with said stationary section of the passageway engaging the rollers when said canopy is lowered to a horizontal position to tilt said adapter unit so that the curved arcuate edge faces downwardly for protection thereof when not in use.

8. The structure as defined in claim 7 together with means for interconnecting said carriage and canopy for pivoting the canopy about a transverse axis at the upper corner thereof remote from the aircraft fuselage for elevating the free end of said canopy and adapter unit thereon for alignment with the door in the fuselage of an aircraft.

9. The structure as defined in claim 8 wherein said means moving the canopy horizontally in relation to the stationary section of the passageway includes means connected between the carriage and stationary section of the passageway for extending the carriage horizontally and retracting the carriage horizontally.

10. The structure as defined in claim 2 wherein said canopy is supported by a plurality of vertically extensible lift members for elevating the canopy and aligning it with a door in the aircraft fuselage.

* * * * *